(12) United States Patent
Rising, III (10) Patent No.: US 6,603,463 B1
(45) Date of Patent: Aug. 5, 2003

(54) METHOD AND AN APPARATUS FOR ELECTRONICALLY CREATING ART

(75) Inventor: Hawley K. Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 283 days.

(21) Appl. No.: 09/707,669

(22) Filed: Nov. 6, 2000

(51) Int. Cl.[7] .................................................. G09G 5/00
(52) U.S. Cl. ........................................ 345/179; 345/156
(58) Field of Search ................................ 345/179, 156; 178/18

(56) References Cited

U.S. PATENT DOCUMENTS

| | | | | |
|---|---|---|---|---|
| 5,155,813 A | * | 10/1992 | Donoghue et al. .......... 345/179 |
| 5,420,607 A | * | 5/1995 | Miller et al. ................. 345/156 |
| 5,488,204 A | * | 1/1996 | Mead et al. ............. 178/18.06 |
| 5,557,301 A | * | 9/1996 | D'Aviau de Piolant ..... 345/179 |
| 5,646,650 A | * | 7/1997 | Miller et al. ................. 345/179 |
| 5,717,168 A | * | 2/1998 | DeBuisser et al. ........ 178/18.04 |
| 5,861,878 A | * | 1/1999 | Lee ............................. 345/179 |
| 6,177,927 B1 | * | 1/2001 | Chery et al. ................. 345/173 |
| 6,377,249 B1 | * | 4/2002 | Mumford .................... 345/179 |

* cited by examiner

*Primary Examiner*—Steven Saras
*Assistant Examiner*—Alecia D. Nelson
(74) *Attorney, Agent, or Firm*—Blakely, Sokoloff, Taylor & Zafman LLP (57) ABSTRACT

The invention relates to a brush comprising a plurality of bristles and each bristle comprises a plurality of fibers. A palette of virtual paint is provided for the brush to contact at least one paint. The brush contacts the tablet and applies paint to the surface of the tablet or image that is created.

38 Claims, 7 Drawing Sheets

A plurality of fibers are coupled together to form one bristle of a plurality of bristles.

800

At least one bristle is bent.

810

The plurality of bristles contact the palette.

820

At least one signal is emitted from at least one bristle that is bent against the tablet.

METHOD AND AN APPARATUS FOR ELECTRONICALLY CREATING ART

BACKGROUND

1. Field of the Invention

This invention relates generally to the field of creating artwork and more specifically, to a method for forming electronic artwork.

2. Background

A variety of programs for creating electronic art by a computer system is available. For example, a computer program such as Canvas™ commercially available from Deneba Software located at 7400 SW 87 Avenue, Miami, Fla. 33173 is used in conjunction with a mouse of a computer system to allow a user to use, for example, a displayed pencil or a paint brush on the graphics display. These graphical utensils are moved by the mouse to make particular designs on the artwork displayed to a user. Although the current method for computer generated brushes or graphical brushes to be used to create images, the conventional computer generated paint brush is not flexible. For example, the computer generated paint brush is not configured to have bristles that bend because it is not a brush that a user may hold.

One disadvantage to the conventional approach is that these utensils do not portray the utensils in a realistic application such as a paint brush. Individuals are typically more comfortable using utensils that are used in the real world environment. It is therefore desirable to have a method of creating art that overcomes the disadvantages of conventional systems used to create electronic art.

SUMMARY

The invention relates to a method and an apparatus for electronically creating art. In one embodiment, an apparatus such as a paint brush comprises a plurality of fibers. Each fiber, having a first end and a second end, is configured to emit signals. The plurality of fibers are coupled together at the first ends of the plurality of fibers to form at least one bristle of a plurality of bristles.

In another embodiment, the paint brush is dipped in electronic paint located on an electronic palette. The paint may be a variety of colors. In another embodiment, the paint may include designs, patterns, or images. The user may then apply the paint such as a plaid paint to a tablet. The plaid paint remains on the tablet where the paint brush was applied.

In yet another embodiment, a user may mix various colors or images and a mixture or diffusion of one or more colors or images is shown on the tip of the paint brush. Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A system is disclosed for electronically creating art by a computer system that more realistically portrays the creation of art in the real world. For example, one embodiment relates to a paint brush that has a brush that bends when contacting a tablet. The paint brush includes a plurality of fibers. Each fiber, configured to emit signals, has a first end and a second end. The plurality of fibers are coupled together at the first ends of the plurality of fibers to form at least one bristle of a plurality of bristles.

In another embodiment, the paint brush is dipped into paint located on an electronic palette. The paint includes traditional colors such as green, yellow, white, red, blue, purple, black, and other various colors. The paint may also include patterns (e.g., plaid), images, or any other type of designs.

In yet another embodiment, a user of the paint brush may desire to create a mixture of two or more paints. For example, the user may wish to mix yellow and blue to obtain a certain shade of green. The plurality of fibers in the plurality of bristles sends signals, for example, to a processor of a computer system. The computer system receives these signals and determines the shade of green that should be created on the display shown to the user. This process may also be applied to a paint brush in which more than one paint has a pattern, image, or design applied to the plurality of fibers that form a plurality of bristles.

In the following description, numerous specific details such as specific materials, processing parameters, processing steps, etc., are set forth in order to provide a thorough understanding of the invention. One skilled in the art will recognize that these details need not be specifically adhered in order to practice the claimed invention. In other instances, well known processing steps, materials, etc., are not set forth in order not to obscure the invention.

Figure 1:
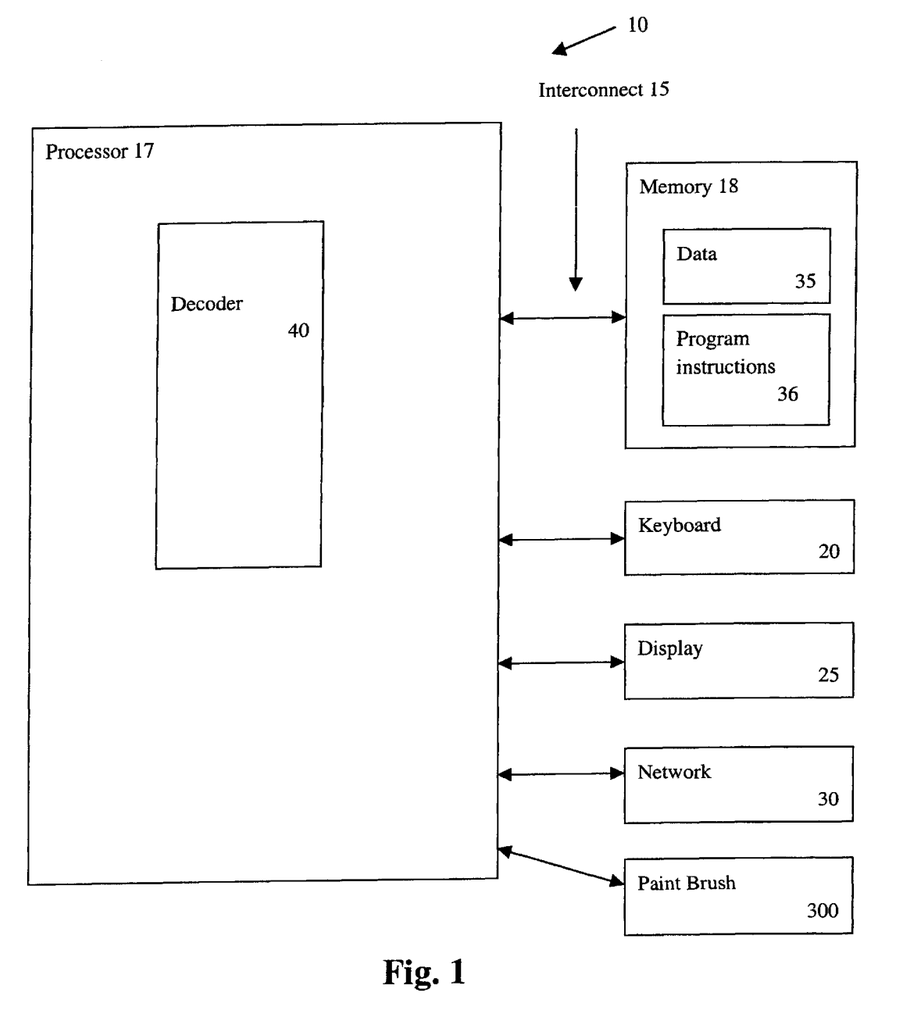
FIG. 1 illustrates one embodiment of a computer system that implements the principles of the present invention.

FIG. 1 illustrates one embodiment of a computer system 10 that implements the principles of the present invention. Computer system 10 includes a processor 17, storage device 18, and interconnect 15 such as bus or a point-to-point link. Processor 17 is coupled to the storage device 18 by interconnect 15. In addition, a number of user input/output devices, such as keyboard 20, display 25, and paint brush 300 are coupled to a chip set (not shown) which is then connected to processor 17. The chipset is typically connected to processor 17 using an interconnect that is different from interconnect 15.

Processor 17 represents a central processing unit of any type of architecture (e.g., the Intel architecture, Hewlett Packard architecture, Sun Microsystems architecture, IBM architecture, etc.), or hybrid architecture. In addition, processor 17 could be implemented on one or more chips. Storage device 18 represents one or more mechanisms for storing data such as the type of paint (e.g., color, pattern, image, or design) that a paint brush has just placed on a tablet. Storage device 18 may include read only memory (ROM), random access memory (RAM), magnetic disk storage media, optical storage media, flash memory devices, and/or other machine-readable media. Interconnect 15 represents one or more buses (e.g., accelerated graphics port bus, peripheral component interconnect bus, industry standard architecture bus, X-Bus, video electronics standards association related to buses, etc.) and bridges (also termed as bus controllers).

While this embodiment is described in relation to a single processor computer system, the invention could be implemented in a multi-processor computer system. In addition to other devices, one or more of a network 30 may be present. Network 30 represents one or more network connections for transmitting data over a machine readable media. The invention could also be implemented on multiple computers connected via such a network.

FIG. 1 also illustrates that the storage device 18 has stored therein data 35 and program instructions (e.g. software, computer program, etc.) 36. Data 35 represents data stored in one or more of the formats described herein. Program instructions 36 represents the necessary code for performing any and/or all of the techniques described with reference to FIGS. 2–7. It will be recognized by one of ordinary skill in the art that the storage device 18 preferably contains additional software (not shown), which is not necessary to understanding the invention.

FIG. 1 additionally illustrates that the processor 17 includes decoder 40. Decoder 40 is used for decoding instructions received by processor 17 into control signals and/or microcode entry points. In response to these control signals and/or microcode entry points, decoder 40 performs the appropriate operations.

Figure 2:
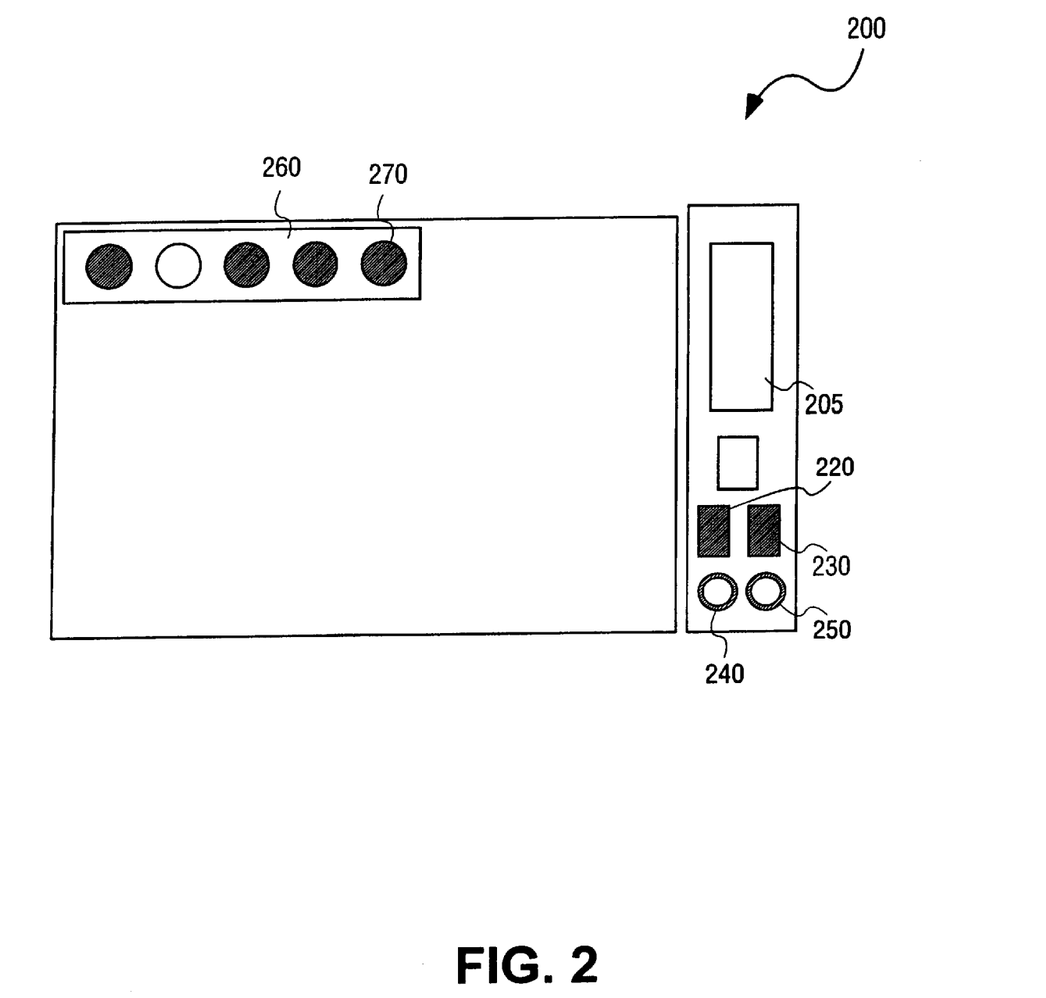
FIG. 2 illustrates one embodiment of a tablet and display.

FIG. 2 illustrates one embodiment of a tablet and display 200. An electronic palette 260 for holding paint is located on tablet and display 200. Electronic palette has a variety of electronic paints that include colors, patterns, images, or other suitable designs 270 located on the upper left hand portion of tablet and display 200. On the right hand side of tablet and display 200 are the controls such as two track balls (240, 250), and three touch-sensitive pads (210, 220, and 230). It will be appreciated that the electronic palette and controls are configured to move in order to adapt to the convenience of left-handed and right-handed users. Tablet and display 200 also has a tray 205 for holding the drawing and writing instruments while not in use.

Track balls (240, 250) are typically used for x, y panning, and for roll, pitch, and yaw that determines the three-dimensional (3-D) viewing angle. Touch pad 220 typically determines the depth of a move through 3-D space in the direction that a user is currently facing. Touch pad 230 adjusts the speed of this move. With touch pads (220, 230) and track balls (240, 250), a user can locate a position at any point in a 3-D space and view an image in any direction. For example, if a user created a 3-D object such as a square block having six sides, the user could use track balls (240, 250) to move in a horizontal or vertical direction to view the square block. Touch pad 220 may be used to rotate the square block, for example, from viewing a top front side view to a bottom back side view of the square block.

Touch pad 210 adjusts the depth of the viewing plane. For instance, if a user is using hand written text, the hand written text may be adjusted at the surface of the tablet. In contrast, for some artistic applications, virtual tools may be used for which a stylus becomes another tool used below the tablet surface and works on a work surface that appears below the desk top. For other viewing applications, a user may find it more comfortable to adjust the viewing surface below the desktop.

In one embodiment, the tablet used includes flat-screen technology that is much brighter and has a higher resolution screen underlying the tablet surface compared to other flat screens. Another tablet that may be used is a radio frequency controlled computer drawing tablet and screen commercially available from Wacom Ltd. Located in Vancouver, Wash. Active technology displays such as field emission displays (FEDs), plasma displays, or other suitable displays could be used as the display replacing the less brilliant light emitting diode (LED) screen.

Regarding the input device for text and line drawings and other suitable drawings, a stylus such as the one manufactured by Wacom Ltd. located in Vancouver, Wash. Additionally, an empty handle, used more like a hand grip rather than a pen, may be configured to attach to virtual objects on the desktop by the same or similar positioning scheme as described for the stylus. This allows a user to have more flexibility and control with regard to the types of devices that he or she uses with the virtual objects to create electronic art work.

Figure 3:
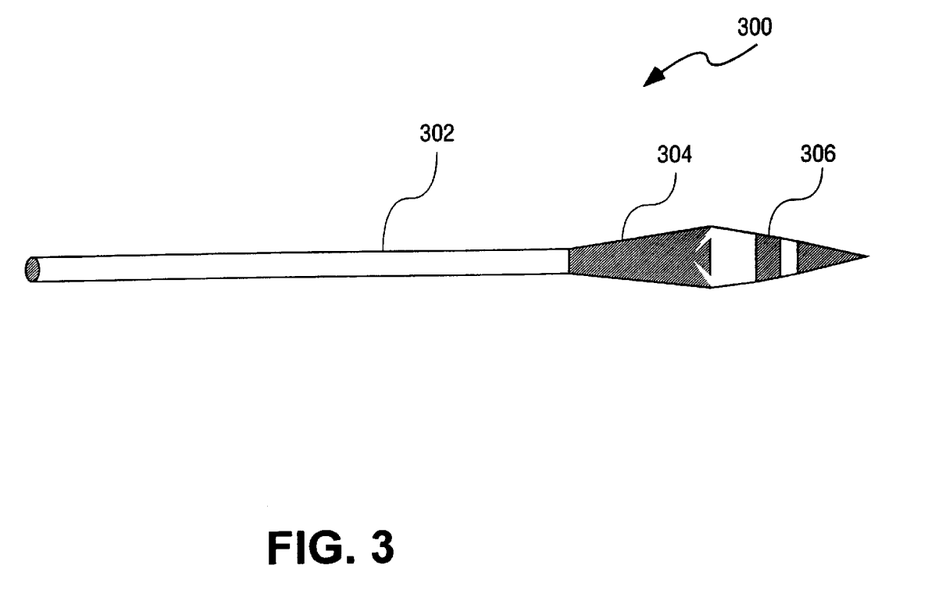
FIG. 3 illustrates one embodiment of a paint brush that is used with a tablet and display.

FIG. 3 illustrates one embodiment of a paint brush 300 that is used with a tablet and display 200 of FIG. 2. Paint brush 300 uses paints with light and is configured to access a palette of virtual paints that include colors, textures, patterns, images, sounds or any other suitable items. Paint brush 300 has an elongated base 302 to allow the user to easily handle paint brush 300 and to manipulate three dimensional objects. Coupled to base 302 is bristle holder 304. Bristle holder 304 is configured to receive a plurality of bristles that comprise brush 306 of paint brush 300. Each bristle includes a plurality of fibers such as glass fibers or any other fibers that can conduct light. Fibers may be of different diameters and lengths. One example of fibers in bristles is presented below.

For a bristle of, for instance, 0.3 millimeters (mm) in diameter, and 3 centimeters (cm) long, in order to allow signals every 2 mm along the bristle, there should be at least a minimum of 15 fibers in a bristle. If the bristle is to have directionality, the number of fibers should be tripled, which is 45 fibers. If the base of the bristle is 0.3 mm in diameter, the maximum diameter of the fibers, allowing for half of the composition to be PVDF and polyaniline coating is 0.3/90 or 0.0034 mm for a fiber diameter. The lengths of the fibers may range from 2 mm to 3 cm along the bristle. If it is desirable to use thicker fibers, then the bristles in the brush may not be all the same length, and the number of signals from the bristles may be decreased allowing signals every 1–2 mm only at the tip such as the last 5 mm of the bristle. In this case, there are only about 10–15 fibers per bristle, or 0.01 mm fiber diameter. Additionally, the bristle lengths may vary from 2–3 mm to 2–3 cm.

One skilled in the art will appreciate that not all brushes have this length of bristle. Brushes for detailed western style art (e.g., watercolor, oil, acrylic, etc.) may have bristles of only about 4 mm in length whereas a brush for Chinese art, Japanese art, or calligraphy would likely utilize bristles as described above of perhaps 3 cm or more. The brush that is used depends upon the genre of art being produced and the requirements of the artist.

The fibers of brush 306 of FIG. 3 are glued or secured together to form a single bristle using a piezopolymer such as b-polyvinylidene fluoride (PVDF). Because a piezopolymer has dielectric characteristics, the piezopolymer provides insulation between signals from the individual fibers. The piezopolymer is also more flexible than, for example, glass and has a property that when straining, the piezopolymer produces a charge such as a piezoelectric effect. The piezoelectric effect is a discharge of energy.

Figure 4:
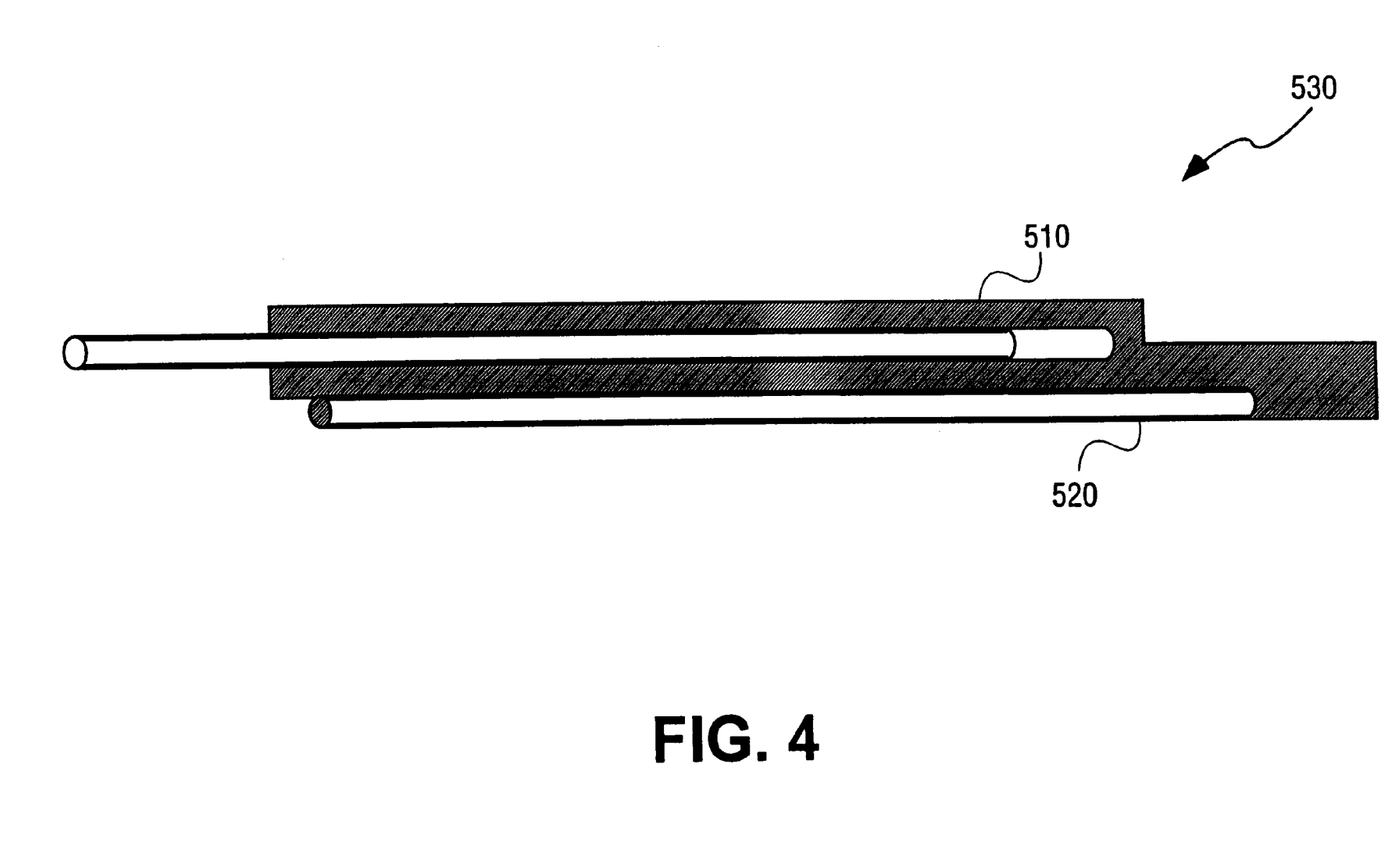
FIG. 4 illustrates one embodiment of fibers of one bristle and that are coated with a conductive material.

Moreover, each glass fiber has a portion of its shank coated with a conductive material such as metal (e.g., silver, gold, copper, aluminum, or other suitable metal) or other suitable conductive material. Preferably silver is used for the purpose of sending a signal from paint brush 300 to processor 17. The conductive material may or may not be optically neutral. If an optically neutral material is used, typically this material is a conductive polymer coating (e.g., polyaniline) which is generally more flexible than a metal film. FIG. 4 illustrates one embodiment of fibers 510 and 520 that are coated with a conductive material such as coating 530.

Figure 5:
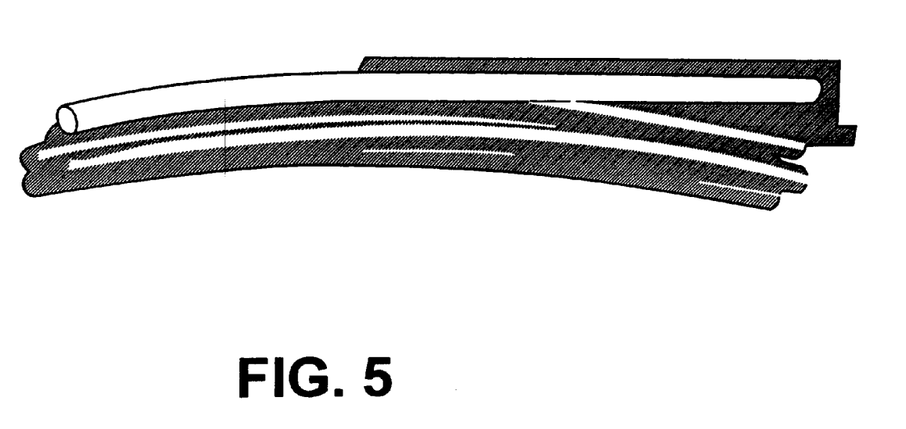
FIG. 5 illustrates fibers that are strained caused at one end of the fibers and the stretch in the conductive material on the fibers.

FIG. 5 illustrates glass fibers that are strained as the PVDF is stretched. This typically allows a substantially precise measurement of the location where the bristles bend and also determines the color of the light paint on paint brush 300 at that location.

Specifically, since the fibers are of different length, the greatest amount of strain is typically caused when the paint brush 300 is bent near the end of a fiber. Distribution of stress on a fiber yields less force on the end than on the shank of the fibers by a factor of about two which is why it is generally easier to bend a bar, for example, in the middle of the bar. This causes a separation near the end of the fiber similar to the way in which a spline separates when modeling a faring curve such as those used in boats. Because the neighboring fibers are of different lengths, a voltage difference exists when amplified causing a discharge of energy. In particular, the strain between the fibers causes the conductive coating to generate an electrical current between the conductors. User advantages are realized as the bending of paint brush 300 functions in a similar fashion to a real paint brush and the separation of fibers that occur when paint brush is placed against a canvas.

Figure 6:
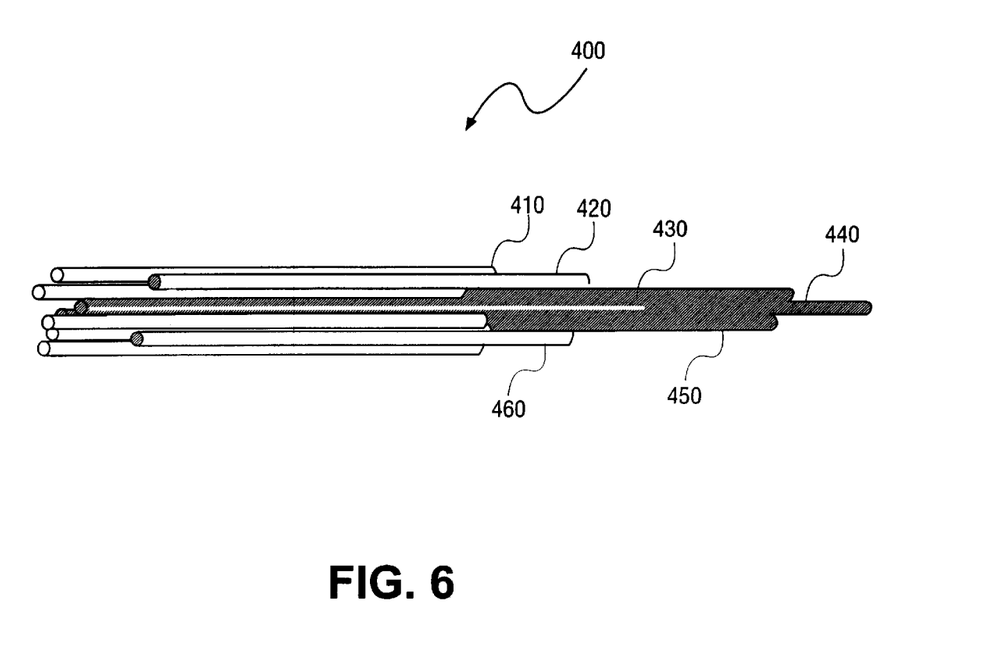
FIG. 6 illustrates one embodiment of fibers of one bristle carrying different colors of light.

The signals from the fibers in the bristle are thresholded, amplified, and then input to processor 17 of computer system 10. A computer program, executed by processor 17, determines which bristles are spreading near the surface of the tablet and the color light paint on the bristle where the paint is likely to adhere to the tablet surface. The computer program then determines the diffusion or mixture of the paint such as color that occurs, for example, between the various colors placed onto paint brush 300 or the various colors that may be mixed onto the tablet. FIG. 6 illustrates one embodiment of fibers carrying different colors of light in one bristle 400 and diffusion of some colors. For example, fiber 410 may be colored with a yellow color light, fiber 420 may be colored with a yellow color light, fiber 430 may be green due to diffusion of yellow from fiber 420 and blue from fibers 440, 450, and 460. Bristle 400 also shows that the fibers have varying lengths of fibers. Varying lengths of fibers are desirable in order to enhance the voltage difference that occurs when the fibers contact, for example, the tablet.

The fibers provide feedback to the user by injecting light into the fibers and illuminating the fibers with the paint (e.g., color) with which the brush is "loaded" by contacting the palette of paint. In one embodiment, this is accomplished by using diode lasers and a mask. Each individual fiber delivers various colors or colors that are mixed and injected into the fiber with a final color.

Paint brush 300 is moved over the palette and pressure is applied to paint brush 300 to enter one of the areas where paint or images are located. For example, the fibers may be dipped into a color map that has red that causes the glass fibers to change to a red light. Alternatively, the brush may be placed in another area that has images or patterns such as plaid paint and dipped in the plaid paint and then the fibers of the brush will have plaid paint on the brush. While painting, the illuminated fibers deposit paint onto the virtual canvas.

In order to clean or remove paint from paint brush 300, paint brush 300 may be tapped onto a clear virtual container on the GUI. The virtual container contains a clear liquid. The clear liquid becomes discolored (or contains patterns, images, or designs, etc.) until paint brush 300 is cleaned to a desired state. For example, the user may desire to completely remove the paint or may desire to remove a portion of the paint. By providing the user with a clear container and with a clear fluid, the user is able to gage the amount of time necessary to remove the appropriate amount of paint from paint brush 300. In another embodiment, the user may flush the discolored liquid and obtain fresh clear liquid, as desired. This is accomplished similar to the method used to empty a trash can in an e-mail service system. For example, an icon (not shown) representing the container with liquid may be displayed on the GUI. When the container is to be emptied and then filled with fresh liquid, the user simply pushes the icon representing the container. The container is then filled with fresh clear liquid. It will be appreciated that there are numerous ways in which to clean a paint brush. For example, computer system 10 could be shut off that causes the brush to be automatically cleaned.

Figure 7:
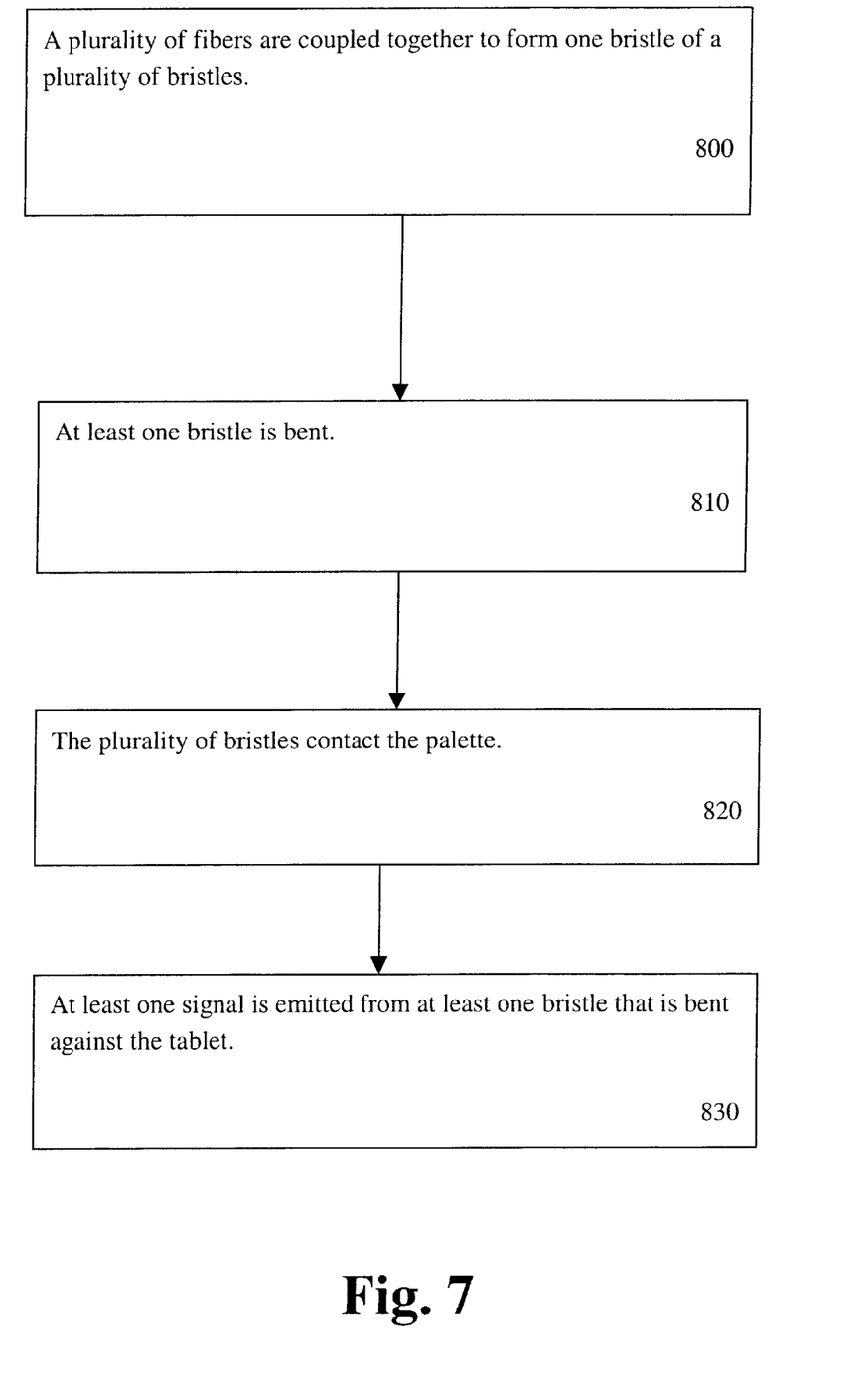
FIG. 7 is a flow diagram of one method of a paint brush dipped into paint to be applied to a tablet.

FIG. 7 is a flow diagram of one method of a paint brush dipped into paint to be applied to a tablet. At block 800, a plurality of fibers are coupled together to form one bristle of a plurality of bristles. At block 810, at least one bristle is bent. At block 820, the plurality of bristles contact the palette. At block 830, at least one signal is emitted from at least one bristle that is bent against a tablet.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
a plurality of fibers, each fiber having a first end and a second end;
the second end of each fiber configured to be illuminated with light;
the plurality of fibers coupled together at the first end of each fiber to form at least one bristle of a plurality of bristles, wherein straining the fibers of a bristle causes a signal to be emitted; and
the plurality of bristles secured to a bristle holder.

2. The apparatus of claim 1, wherein the plurality of fibers are glass fibers.

3. The apparatus of claim 2, wherein each fiber of the plurality of fibers are different lengths.

4. The apparatus of claim 1, wherein the first ends of the plurality of fibers are coated with a conductive material.

5. The apparatus of claim 4, wherein the conductive material is metal.

6. The apparatus of claim 5, wherein the fibers are strained by the fibers placed against a tablet producing a charge.

7. The apparatus of claim 6, wherein a voltage difference exists between a first fiber having a first length and a second fiber having a second length.

8. The apparatus of claim 7, wherein signals emitted from a bristle are amplified and transmitted to program instructions executed by a processor of a computer system.

9. The apparatus of claim 8, wherein the computer system determines which bristles are spreading near a top surface of the tablet.

10. The apparatus of claim 9, wherein the program instructions executed on a processor perform diffusion of more than one color.

11. The apparatus of claim 9, wherein
the bristles are placed into a color map to load one of a color, pattern, and an image.

12. The apparatus of claim 1, further comprising:
a brush including the plurality of bristles, wherein;
the brush contacts least one electronic paint located on one of a palette and a tablet.

13. A method comprising:
coupling a plurality of bristles, each bristle comprising a plurality of fibers and configured to emit signals as a result of straining the fibers;
emitting at least one signal from at least one bristle that is bent against a tablet; and
applying electronic paint to a surface of the tablet.

14. The method of claim 13, further comprising:
determining diffusion from a plurality of bristles.

15. The method of claim 14, wherein the diffusion is one of color diffusion and image diffusion.

16. The method of claim 13, wherein the fibers are glass fibers.

17. The method of claim 13, further comprising:
securing a plurality of fibers together at a first end of each fiber.

18. The method of claim 13, further comprising:
coating with a conductive material the first ends of the plurality of fibers.

19. The method of claim 13, further comprising:
determining a point on the bristle at which at least two fibers are bent by the tablet, wherein a voltage difference exists between a first fiber within a close proximity of a second fiber.

20. The method of claim 13, wherein signals emitted from a bristle are amplified and transmitted to program instructions executed by a processor of a computer system.

21. The method of claim 20, wherein the computer system determines which bristles are spreading near a top surface of the tablet.

22. The method of claim 13, further comprising:
providing a brush comprising the plurality of bristles; and
providing a palette of electronic paint; wherein
contacting the brush with at least one electronic paint; and
contacting a tablet with the electronic paint on the brush applies the electronic paint to a portion of a surface of the tablet.

23. The method of claim 22, further comprising:
determining diffusion of the electronic paint from combining at least two different paints.

24. The method of claim 22, wherein the electronic paint includes one of color, pattern, image, and design.

25. An article comprising:
a storage medium including instructions stored thereon which when executed cause a computer system to perform a method including:
determining a type of virtual paint on a brush, the brush comprising a plurality of bristles wherein each bristle comprises a plurality of fibers and wherein straining the fibers of a bristle causes a signal to be emitted; and
applying virtual paint to a tablet when the brush is stroked against the tablet.

26. The article of claim 25, the method further comprising:
determining color diffusion from a plurality of bristles.

27. The article of claim 25, wherein the fibers are glass fibers.

28. The article of claim 25, wherein each fiber has a first end and a second end, the plurality of fibers secured together at the first end of the fibers.

29. The article of claim 25, wherein the method further comprises:
removing virtual paint from one of the brush and a container for cleaning the virtual paint from the brush.

30. The article of claim 25, wherein the first ends of the plurality of fibers are coated with a conductive material.

31. The article of claim 30, wherein the conductive material is metal.

32. The article of claim 25, wherein a voltage difference exists between a first fiber having a first length and a second fiber having a second length.

33. The article of claim 25, wherein signals emitted from a bristle are amplified and transmitted to program instructions executed by a processor.

34. The article of claim 25, wherein the computer system determines which bristles are spreading near a top surface of the tablet.

35. A computer system comprising:
a processor coupled to a memory, a brush, a palette of electronic paint, and a tablet;
a brush having a plurality of bristles coupled to the processor, each bristle comprising a plurality of fibers and configured to emit signals as a result of straining the fibers;
a palette of electronic paint coupled to the processor;
a tablet coupled to the processor;
an interconnect coupled to the processor and the brush that allows signals to be transmitted between the processor and the brush; and
an interconnect coupled to the processor and the memory to allow data to be transported between the memory and the processor.

36. The computer system of claim 35, wherein the plurality of bristles bend, the bend in the plurality of bristles creates diffusion.

37. The computer system of claim 36, wherein the diffusion is one of color diffusion and image diffusion.

38. The computer system of claim 35, wherein the processor causes the electronic paint is removed from the brush.

* * * * *